US009785574B2

(12) United States Patent
Chou (10) Patent No.: US 9,785,574 B2
(45) Date of Patent: Oct. 10, 2017

(54) TRANSLATION LOOKASIDE BUFFER THAT EMPLOYS SPACIAL LOCALITY

(71) Applicant: Oracle International Corporation, Redwood City, CA (US)

(72) Inventor: Yuan Chou, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 162 days.

(21) Appl. No.: 14/794,438

(22) Filed: Jul. 8, 2015

(65) Prior Publication Data

US 2017/0010976 A1    Jan. 12, 2017

(51) Int. Cl.
 *G06F 12/00* (2006.01)
 *G06F 12/1027* (2016.01)

(52) U.S. Cl.
 CPC .... *G06F 12/1027* (2013.01); *G06F 2212/654* (2013.01); *G06F 2212/68* (2013.01)

(58) Field of Classification Search
 CPC ............. G06F 12/1027; G06F 12/0215; G06F 2212/654; G06F 2212/68
 See application file for complete search history.

(56) References Cited

U.S. PATENT DOCUMENTS

| 6,625,715 | B1 * | 9/2003 | Mathews ............ G06F 12/1027 711/205 |
| 7,366,829 | B1 * | 4/2008 | Luttrell ............... G06F 11/1064 711/108 |
| 7,636,832 | B2 | 12/2009 | Raj et al. |
| 8,356,158 | B2 | 1/2013 | So et al. |
| 8,667,258 | B2 | 3/2014 | Prasky et al. |
| 8,984,254 | B2 | 3/2015 | Tran et al. |

* cited by examiner

*Primary Examiner* — David X Yi
*Assistant Examiner* — Tahilba Puche
(74) *Attorney, Agent, or Firm* — Meyertons, Hood, Kivlin, Kowert & Goetzel, P.C.

(57) ABSTRACT

A system may include a memory that includes a plurality of pages, a processor, and a translation lookaside buffer (TLB) that includes a plurality of entries. The processor may be configured to access data from a subset of the plurality of pages dependent upon a first virtual address. The TLB may be configured to compare the first virtual address to respective address information included in each entry of the plurality of entries. The TLB may be further configured to add a new entry to the plurality of entries in response to a determination that the first virtual address fails to match the respective address information included in each entry of the plurality of entries. The new entry may include address information corresponding to at least two pages of the subset of the plurality pages.

12 Claims, 7 Drawing Sheets

| | CAM 301 | | | | | |
|---|---|---|---|---|---|---|
| | PID 303 | CID 304 | VADDR 305 | size 306 | valid 307 | used 308 |
| 310a | 1 | 3 | 0x123456C000 | 16KB | 1 | 1 |
| 310b | 2 | 1 | 0x1055AA0000 | 32KB | 1 | 0 |
| 310c | 5 | 4 | 0x410FC00000 | 4MB | 1 | 0 |
| 310d | 0 | 0 | 0 | 0 | 0 | 0 |
| | ⋮ | ⋮ | ⋮ | ⋮ | ⋮ | ⋮ |

| | RAM 302 | | |
|---|---|---|---|
| | PADDR0 311 | PADDR1 312 | a_mask 313 |
| 320a | 0x4455664000 | 0x4455668000 | 0xFFFFFC000 |
| 320b | 0x6210DE8000 | 0x95432F0000 | 0xFFFFFF8000 |
| 320c | 0x1124400000 | 0 | 0xFFFFC00000 |
| 320d | 0 | 0 | 0 |
| | ⋮ | ⋮ | ⋮ |

| Requested address 330 | | | | | | | | | | |
|---|---|---|---|---|---|---|---|---|---|---|
| HEX | 1 | 0 | 5 | 5 | A | A | 4 | 3 | 2 | 1 |
| BIN | 0001 | 0000 | 0101 | 0101 | 1010 | 1010 | 0100 | 0011 | 0010 | 0001 | bit 39    bit 14    bit 0

| CAM 301 | | | | | |
|---|---|---|---|---|---|
| PID 303 | CID 304 | VADDR 305 | size 306 | valid 307 | used 308 |
| 1 | 3 | 0x123456C000 | 16KB | 1 | 1 |
| 2 | 1 | 0x1055AA0000 | 32KB | 1 | 0 |
| 5 | 4 | 0x410FC00000 | 4MB | 1 | 0 |
| 0 | 0 | 0 | 0 | 0 | 0 |

*310a*
*310b*
*310c*
*310d*

| RAM 302 | | |
|---|---|---|
| PADDR0 311 | PADDR1 312 | a_mask 313 |
| 0x4455664000 | 0x4455668000 | 0xFFFFFFC000 |
| 0x6210DE8000 | 0x95432F0000 | 0xFFFFFF8000 |
| 0x1124400000 | 0 | 0xFFFFC00000 |
| 0 | 0 | 0 |

*320a*
*320b*
*320c*
*320d*

| Requested address 330 | | | | | | | | | | |
|---|---|---|---|---|---|---|---|---|---|---|
| HEX | 1 | 0 | 5 | 5 | A | A | 4 | 3 | 2 | 1 |
| BIN | 0001 | 0000 | 0101 | 0101 | 1010 | 1010 | 0100 | 0011 | 0010 | 0001 | bit 39  bit 14  bit 0

FIG. 7

TRANSLATION LOOKASIDE BUFFER THAT EMPLOYS SPACIAL LOCALITY

BACKGROUND

Field of the Invention

The embodiments herein relate to processors and, more particularly, to implementation of data prefetch systems.

Description of the Related Art

Computing systems and processors may utilize virtualized memory techniques for various reasons, including, for example, to improve performance of memory usage, allow usage of multiple memory devices, or to increase reliability of memory cells. Virtualization of memory may include use of memory mapping tables to associate a virtual address with a physical address. When a processor operates with virtual memory, addresses used by the processor may correspond to virtual addresses that are translated into physical addresses. In other words, the virtual address may not equal the physical address (the actual address in the physical memory where information is stored).

The use of virtual addresses may allow data and program instructions to be physical relocated in a system memory by a memory controller or memory management unit. The memory controller may store the data or instructions in physical locations that provide fast access or long-term data retention. The memory controller may maintain translation tables that link a particular virtual address or range of addresses to a corresponding physical address or range of addresses. Since the memory controller maintains the translation tables, software executed by a processor does not have to be modified to reflect a current location of data and instructions in the physical memory.

The address translation process, however, may introduce additional steps for storing and retrieving information in a memory. To reduce delays due to address translations, a processor or computing system may include a translation lookaside buffer. The translation lookaside buffer stores translation information for recent memory accesses, allowing reduced access times to memory locations that are accessed more frequently.

SUMMARY

Various embodiments of a translation lookaside buffer (TLB) are disclosed. Broadly speaking, a system, an apparatus, and a method are disclosed in which an embodiment of the system may include a memory that includes a plurality of pages, a processor, and a TLB that includes a plurality of entries. The processor may be configured to access data from a subset of the plurality of pages dependent upon a first virtual address. The TLB may be configured to compare the first virtual address to respective address information included in each entry of the plurality of entries. The TLB may be further configured to add a new entry to the plurality of entries in response to a determination that the first virtual address fails to match the respective address information included in each entry of the plurality of entries. The new entry may include address information corresponding to at least two pages of the subset of the plurality pages.

In a further embodiment, the new entry may include one virtual address and at least two physical addresses. In another embodiment, the processor may be further configured to access data from the subset of the plurality pages using a second virtual address.

In an embodiment, the TLB may be further configured to determine that a subset of bits of the second virtual address corresponds to a subset of bits of the first virtual address. The TLB may also be configured to send a respective physical address corresponding to the second virtual address to the memory. The respective physical address may be determined dependent upon one of the at least two physical addresses in the new entry and the second virtual address.

In another embodiment, each entry of the plurality of entries may include a respective information bit. To add the new entry to the plurality of entries, the TLB may be further configured to identify an existing entry of the plurality of entries dependent upon the respective information bit.

In a further embodiment, the TLB may also be configured to determine the existing entry includes a number of physical addresses that is less than a maximum number of physical addresses. The maximum number of physical addresses for each entry of the plurality of entries may be greater than one. In one embodiment, the TLB may be further configured to replace the existing entry with the new entry.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

DETAILED DESCRIPTION OF EMBODIMENTS

Introduction

Generally speaking, a processor core (or simply, a "core") may refer to a unit of a processor that is capable of executing program instructions and processing data independently of other processor cores within the processor, such that multiple cores may execute instructions concurrently. Performance of a processing core may be impacted by a multitude of factors, including processor clock speed, the number of cores in the processor, and speed of the memory accesses.

A memory controller, or memory management unit, may allow use of virtual addresses by a core. Use of virtual addresses (also referred to as "logical addresses") allows data and program instructions to be physical relocated in a memory system. Use of virtual addresses may also enable a memory system to use multiple types of memory devices. The memory controller may store the data or instructions in physical locations that, for example, provide fast access, reduced power consumption, or long-term data retention, depending on a current usage of the data or instructions. Translation tables may be used to link virtual addresses to corresponding physical addresses. Software executed by the core does not have to be aware of specific physical addresses in the memory system since one or more memory controllers maintain the translation tables to reflect current locations of data and instructions in the physical memory.

To access data stored in the memory, the core request the data using the virtual address. The corresponding memory controller (or controllers) determines the physical location of the data dependent upon the virtual address. This address translation process, however, may introduce additional steps for accessing information in the physical memory. A processor or computing system may include a translation lookaside buffer (TLB) to reduce delays due to the address translations. The translation lookaside buffer may store translation information for recent memory accesses, thereby reducing the address translation time for memory locations that are accessed often.

A TLB may include memory arrays for storing translation entries. While larger memory arrays for the TLB may provide a performance improvement by increasing a number of translation entries, the increases may be offset by increased system cost and power consumption. Embodiments of a method for improving the efficiency of memories in a TLB are contemplated. Devices and methods are presented herein that may help increase a number of translation entries included in a TLB.

Figure 1:
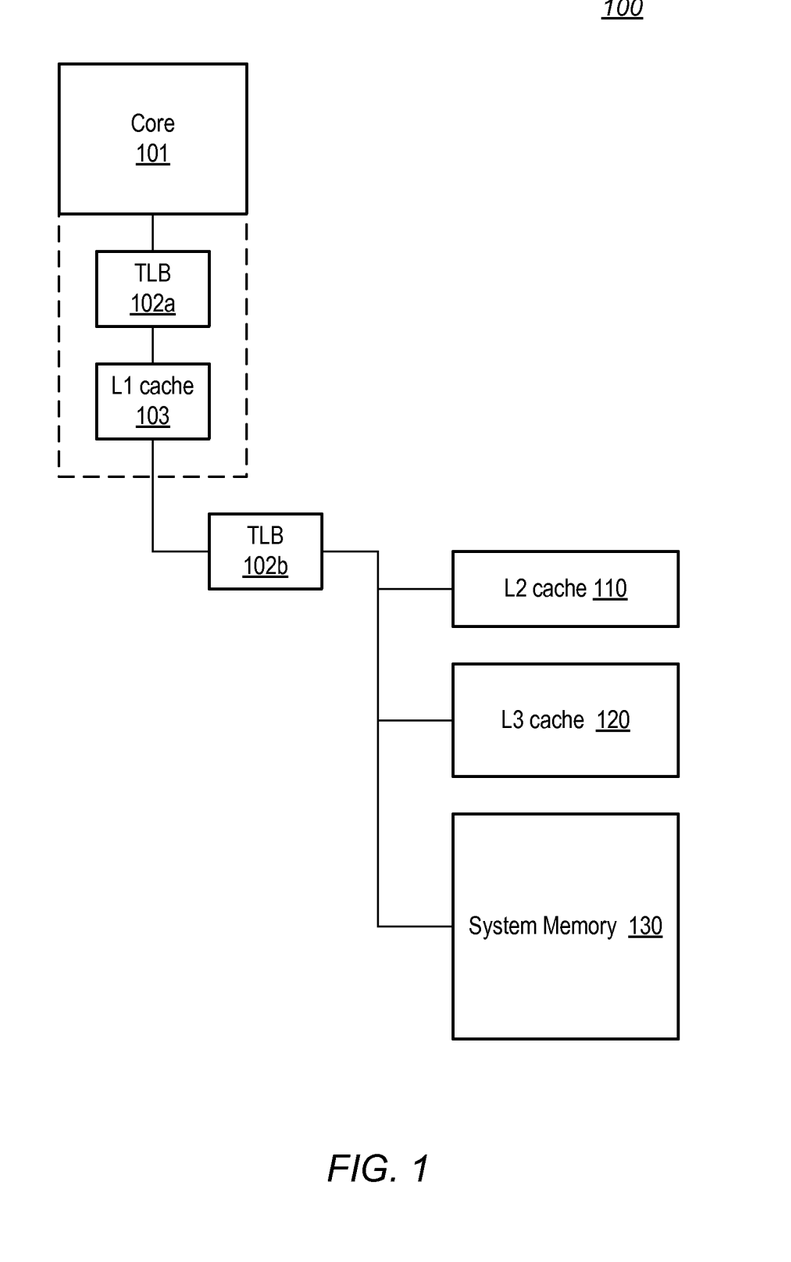
FIG. 1 is a block diagram illustrating an embodiment of a processor memory path.

A processor core and memory system are illustrated in FIG. 1. In the illustrated embodiment, system 100 includes core 101 coupled to L1 cache 103 via translation lookaside buffer (TLB) 102a. L1 cache 103 is further coupled to L2 cache 110, L3 cache 120 and system memory 130, via TLB 102b. In various embodiments, system 100 may include multiple integrated circuits (ICs) coupled on one or more circuit boards or may be implemented as a single IC.

Core 101 may be configured to execute instructions and to process data according to a particular Instruction Set Architecture (ISA). In some embodiments, core 101 may be configured to implement the SPARC® V9 ISA, although in other embodiments it is contemplated that any desired ISA may be employed, such as x86, PowerPC® or ARM®, for example. In various embodiments, core 101 may include any suitable number of cores. Core 101 may include hardware for supporting multitasking or multithreading. Such multi-threaded cores are capable of supporting more than one software process at a time. In some embodiments, core 101 may be included in a processor with TLB 102a and L1 cache 103, as indicated by the dashed line in FIG. 1.

Translation lookaside buffers 102a-b may be configured to receive a virtual address and return a respective physical address if the received virtual address corresponds to an entry stored in the respective TLB 102a-b tables. TLB 102a may, in some embodiments, be included as part of memory management unit in a processor with core 101. TLB 102b may not be included in some embodiments, in which case, TLB 102a may be the only TLB in system 100. In the present embodiment, a given TLB 102a-b receives a virtual address associated with a memory access initiated by core 101. Upon receipt of the virtual address, the given TLB 102a-b compares at least a portion of the virtual address to entries in translation tables included in the given TLB. If a match is determined, then a physical address is determined based on at least a portion of the virtual address and a physical address corresponding to the matching entry. In various embodiments, the resulting physical address is returned to core 101, a memory management unit associated with core 101, a memory controller coupled to a memory associated with physical address, or to a memory device corresponding to the physical address. If a match is not found among the existing entries, then a new entry is added, including the virtual address and one or more corresponding physical addresses. Additional details concerning the operation of TLB 102a-b will be provided below.

L1 cache 103 may reside within core 101 or may reside between core 101 and TLB 102b. L1 cache 103 may be configured to cache instructions and/or data for use by core 101. In some embodiments, cache 103 may be implemented using set-associative or direct-mapped techniques. L1 cache 103 may be a first memory that core 101 accesses in response to a memory request. An L1 cache "hit" occurs when data for a given memory address is determined to be stored in L1 cache 103. Similarly, an L1 cache "miss" occurs when data for a given memory address is determined to be missing from L1 cache 103.

L2 cache 110 may also be configured to cache instructions and/or data for use by core 101. If a given memory address results in an L1 cache miss, then L2 cache 110 may be the next memory to be queried for the data. In some embodiments, L2 cache 110 may include various queues and buffers configured to manage the flow of data to and from L1 cache 103 as well as to and from L3 cache 120.

Like L1 cache 103 and L2 cache 110, L3 cache 120 may be configured to store instructions and/or data for use by core 101. Also similar to L1 cache 103 and L2 cache 110, L3 cache 120 may be implemented using set-associative or direct-mapped techniques. Upon an L2 cache miss, L3 cache 120 may be a next memory accessed for the requested data.

System memory 130 may correspond to one or more types of memory for storing programs and data. System memory 130 may include volatile memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. Non-volatile memory may also be included in system memory 130, such as, for example, a hard-disc drive (HDD), a solid state drive (SSD), an optical disc storage (e.g., DVD-ROM or CD-ROM), or combination thereof. In some embodiments, system memory 130 may correspond to one or more memory controllers used to interface with the above types of memories. Upon an L3 cache miss, system memory 130 may be next memory accessed to locate the requested data.

It is noted that FIG. 1 is merely an example of a system including a core and memories. In other embodiments, system 100 may include multiple cores as well as additional functional blocks, such as, for example, network and/or peripheral interfaces. In various embodiments, the organization of FIG. 1 may represent a logical organization rather than a physical organization, and other components may also be employed.

Figure 2:
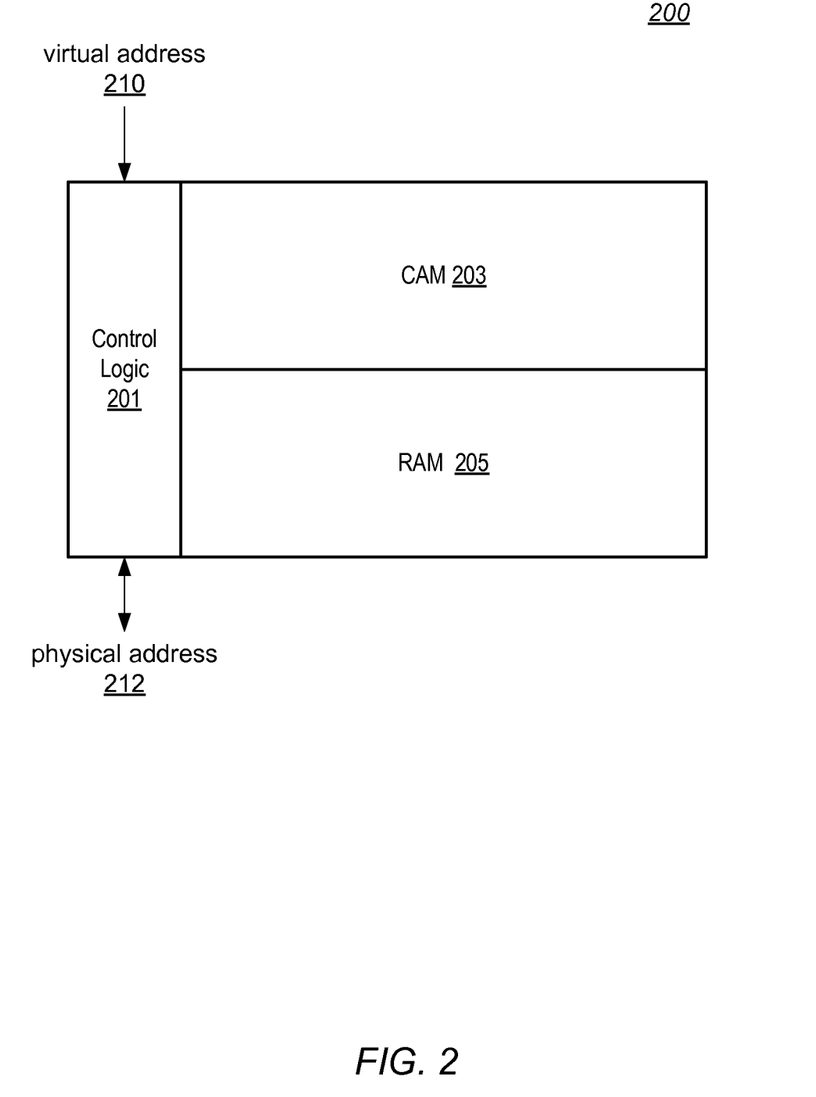
FIG. 2 is a block diagram illustrating an embodiment of a translation lookaside buffer.

Turning to FIG. 2, an embodiment of a translation lookaside buffer (TLB) is illustrated. TLB 200 may correspond to TLB 102a and/or TLB 102b as illustrated in FIG. 1. TLB 200 includes control logic 201, Content Addressable Memory (CAM) 203 and Random Access Memory (RAM) 205. TLB 200 receives virtual address 210 and receives as well as outputs physical address 212.

In the present embodiment, control logic 201 receives virtual address 210 from a memory request by a processor, such as, for example, core 101 in FIG. 1. Control logic 201 then compares a portion of the bits of virtual address 210 to entries in CAM 203. Each entry in CAM 203 includes a similar portion of a virtual address related to a previous memory request. A TLB "hit" occurs if the portion of logical address 210 matches a previously requested virtual address in one of the CAM entries. Otherwise, a TLB miss occurs when a matching address is not found. Upon a TLB hit, control logic 201 determines a corresponding entry from RAM 205 dependent upon the matched CAM entry and at least one additional bit of virtual address 210. The corresponding entry in RAM 205 includes at least a portion of physical address 212. A complete physical address 212 may be determined dependent upon virtual address 210 and the corresponding entry in RAM 205. Control logic 201 then sends physical address 212 either back to the requesting processor, or to a memory device corresponding to physical address 212.

CAM 203 includes content addressable memory (CAM) in which the contents of the CAM may be compared directly to a bit-pattern. In the embodiment of TLB 200, a portion of a virtual address is stored in CAM 203 as an individual entry if that address is not found in CAM 203. An equivalent portion of a received virtual address is used as the bit-pattern to search the existing entries in CAM 203 for a match. Upon a TLB hit, CAM 203 returns an address that may be used to access physical address information stored in RAM 205. Using a CAM rather than random access memory (RAM) may result in a much faster search. A CAM array, however, may be larger than a RAM array for a same amount of memory cells. Entries in CAM 203, therefore, may primarily include information for determining a TLB hit or miss.

Additional information for determining a physical address corresponding to the virtual address stored in CAM 203 is stored in RAM 205, which includes random access memory (RAM). In some embodiments, RAM 205 may be organized in rows with each row having a capacity for storing physical address information for two or more physical addresses. In such an embodiment, a TLB hit for a portion of a virtual address in CAM 203 returns an address corresponding to a row in RAM 205 that includes the physical address information for two or more physical addresses corresponding to the virtual address. A single physical address may be determined using additional bits of the virtual address.

In other embodiments, RAM 205 may include two or more segments, in which each segment includes multiple rows with each row including a storage capacity capable of storing physical address information for one physical address. A TLB hit for a portion of a virtual address in such an embodiment may result in CAM 203 returning an address corresponding to one row in each segment of RAM 205. A single segment, storing the requested physical address, may be determined using additional bits of the virtual address.

It is noted that the system of FIG. 2 is merely an example and functional blocks are limited to emphasize the functionality of a TLB. In other embodiments, more functional blocks may be included. The sizes of the functional blocks in FIG. 2 are not intended to infer relative sizes of each functional block.

Figure 3:
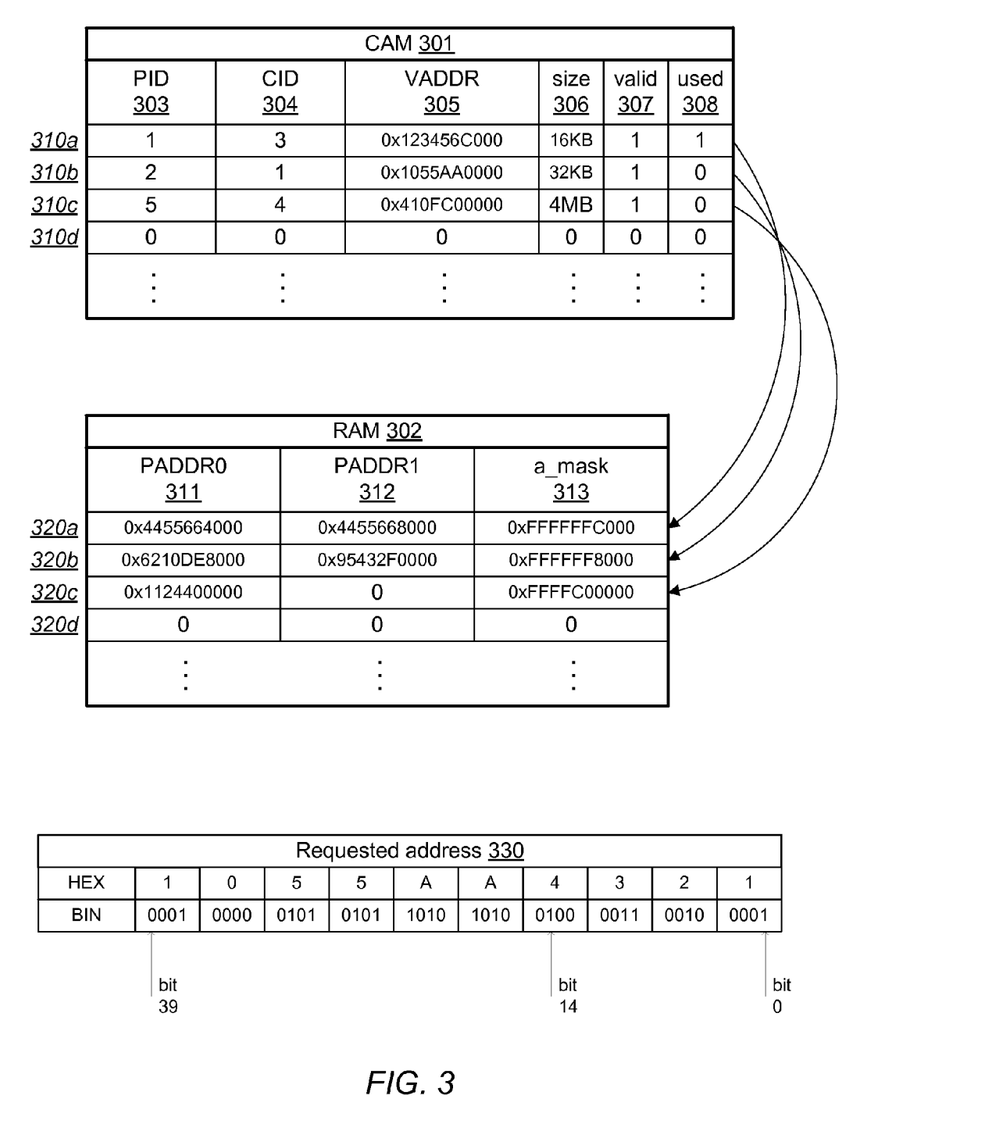
FIG. 3 illustrates a first embodiment of data tables associated with a translation lookaside buffer.

Moving to FIG. 3, illustrations of data tables associated with an embodiment of a translation lookaside buffer are shown. CAM 301 and RAM 302 illustrate a logical representation of how data may be organized within a TLB such as, for example, TLB 200 in FIG. 2. CAM 301 shows the organization of values for a content addressable memory, such as, for example, CAM 203 in FIG. 2. RAM 302 illustrates the organization of a TLB RAM, such as, for example, RAM 205 in FIG. 2.

In the illustrated embodiment, CAM 301 includes multiple entries 310 (only entries 310a-d are shown for simplicity). Each entry 310 includes six data values. Partition identification (PID) 303 indicates a memory partition associated with the respective entry 310. For example, the memory of a computing system may include any suitable number of partitions and each partition may have a respective set of physical addresses. PID 303, therefore, links a given CAM entry 310 to a respective memory partition. Context identification (CID) 304 determines a respective context for a given virtual address. In some computing systems, for example, a multi-core processor or a multi-threaded core may establish a virtual address map for each active process. If three processes are active, then the computing system may be supporting three separate virtual address maps. CID 304 is used to determine a respective virtual address map for a given CAM entry 310.

Virtual address (VADDR) 305 is the virtual address associated with the given CAM entry 310. In some embodiments, a portion of the virtual address 305 bits may be omitted or may be set to a value of '0', depending on a value of size 306. Size 306 indicates a size of a page of memory being mapped. Typically, virtual addresses are mapped to physical addresses in groups of consecutive addresses referred to as "pages." For example, a virtual address map may organize a 512 Megabyte (MB) memory into 512 one MB pages, 256 two MB pages, or 64 eight MB pages. Both virtual addresses and physical addresses for each page of memory are consecutive, such that, for a 1 MB page, address bits [19:0] of both the virtual and physical addresses are the same. The virtual address maps, therefore, may only map address bits [28:20] of a 512 MB memory map.

CAM 301 additionally includes valid bit 307 and used bit 308. Valid bit 307 indicates if the values of the corresponding entry are still valid. A CAM entry 310 may become invalid if data at the corresponding physical memory location has been moved or erased, such as, for example, by another process or core in the computing system. Used bit 308 indicates if a corresponding entry 310 has been used for a translation operation since a time when the used bit field 308 was reset or cleared. The used bit 308 for all entries may be reset upon an initialization of the TLB and then again when the used bit 308 for all entries 310 are set. An individual used bit 308 is set when the corresponding entry 310 is used in a TLB hit. Upon a TLB miss, the used bit 308 may be used to determine if the corresponding entry 310 is a candidate for replacement by a new entry that includes the missing virtual address. The entry replacement process will be explained in more detail later.

The tables shown in FIG. 3 include 40-bit addresses, representing a memory map of approximately one Terabyte (TB). To search CAM entries 310 in the current embodiment, a PID value and a CID value corresponding to a virtual address are searched in the PID 303 and CID 304 columns along with the virtual address in the VADDR 305 column. A number of bits of the virtual address may be "masked off" depending on the size of a memory page as determined by the respective size 306 value. As used herein, "masked off" refers to ignoring one or more of the less significant bits of the virtual address. If a TLB hit occurs, then an address is returned from CAM 301 that corresponds to an address of a corresponding entry in RAM 302.

In the illustrated embodiment, RAM 302 includes a number of entries 320 equal to the number of CAM 301 entries 310, such that a one-to-one correspondence is established. For example, RAM entry 320a corresponds to CAM entry 310a, RAM entry 320b to CAM entry 310b, and so forth. Each RAM 320 entry includes three fields, a first physical address (PADDR0) 311, a second physical address (PADDR1) 312, and an address mask (a_mask) 313. Each entry 320, therefore, can map two pages of physical memory to a single CAM entry 310. In other embodiments, more than two physical memory pages may be mapped to a single CAM entry 310 by increasing the number of physical address fields in each entry 320 of RAM 302. Upon a TLB hit, one of the two physical addresses in the respective RAM entry 320 may be selected dependent upon the virtual address and combined with an unused portion of the virtual address to determine a physical address mapped to the virtual address.

As an example of the translation operation, requested virtual address 330 with a value of 0x1055AA4321 is requested (by core 101 of FIG. 1, for example) with a corresponding PID if 2 and a CID of 1. Control logic, such as, e.g., control logic 201 determines that the PID value and CID value match at CAM entry 310b. Control logic 201 uses the page size 306 of entry 310b (32 KB) to determine how many bits of requested address 330 to compare to VADDR 305. For a 32 KB page size, control logic 201 masks off bits [14:0] of requested address 330, creating a search address of 0x1055AA0000, which matches VADDR 305 of entry 310b. CAM 301 returns an address to control logic 201 corresponding to entry 320b of RAM 302. Based on the 32 KB page size, control logic 201 uses the most significant bit of the unused requested virtual address bits (bit [14], equal to 1) to select PADDR1 312. Control logic 201 uses address mask 313 to extract bits [39:15] of PADDR1 312 (0x95432F) and bits [14:0] of requested address 330 (0x4321). The two extracted values are combined to create a physical address of 0x95432F4321, which is used to fulfill the memory request.

It is noted that the tables of FIG. 3 are merely an example. In some embodiments, additional information may be included in either CAM 301 or RAM 302. In other embodiments, some fields may not be implemented, such as, for example, PID 303 or CID 304. The tables of FIG. 3 are not intended to represent a physical arrangement of data stored in a CAM or a RAM, but instead, are intended to merely illustrate a logical organization of data that may be included.

Figure 4:
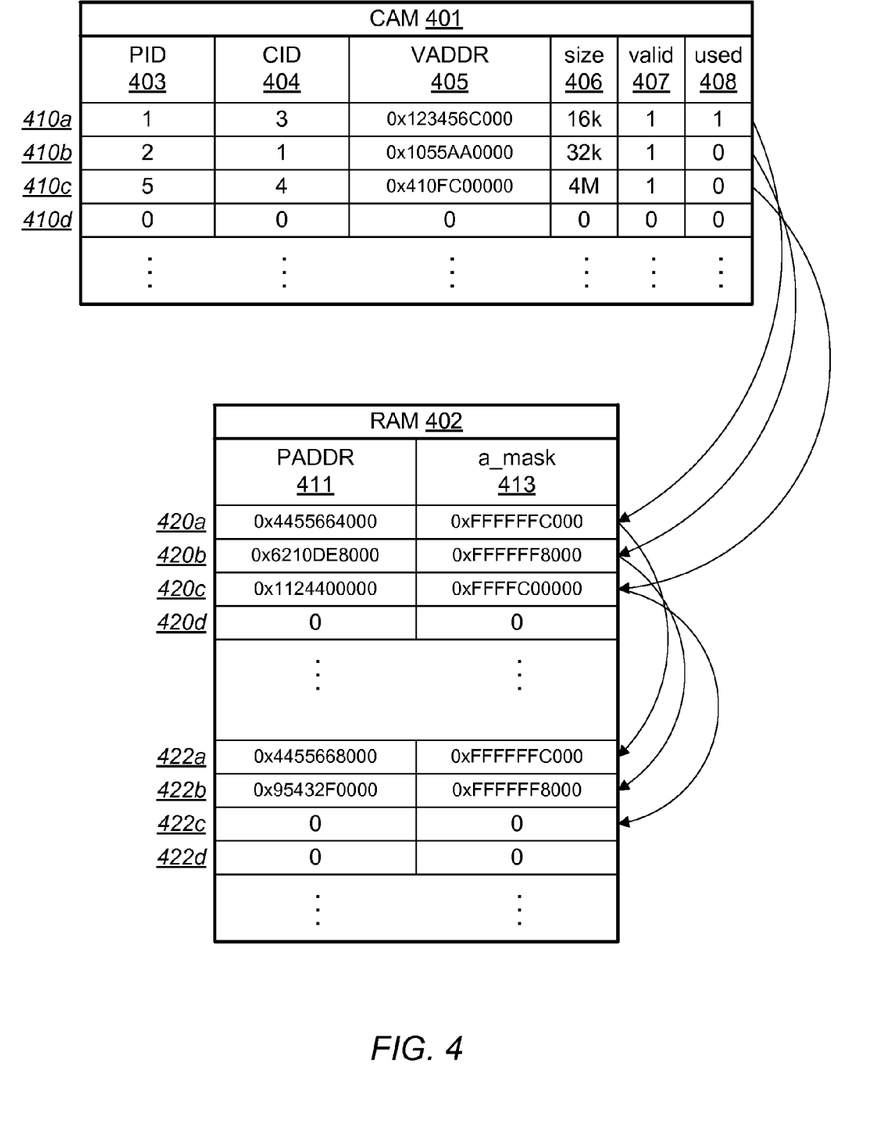
FIG. 4 illustrates a second embodiment of data tables associated with a translation lookaside buffer.

Turning now to FIG. 4, data tables representing another embodiment of a translation lookaside buffer is illustrated. Tables contained in a TLB, such as, for example, TLB 200 in FIG. 2, may include CAM 401 and RAM 402. CAM 401 is similar in content and operation to CAM 301 in FIG. 3, unless otherwise noted. RAM 402 illustrates another embodiment for a TLB RAM.

Similar to RAM 302 in FIG. 3, RAM 402 includes information for determining a physical address mapped to a corresponding virtual address in CAM 401. RAM 402, however, includes multiple RAM segments in which each segment includes a number of entries equal to the number of entries in CAM 402. As used herein, a RAM "segment" refers to a partition of RAM including a range of addresses. A segment may have beginning and ending addresses that correspond to a physical feature of a RAM array or a segment may correspond to one or more full arrays. In other embodiments, a RAM segment may not align with physical features of a RAM array, and instead, simply correspond to a logical division of one or more RAM arrays. In the illustrated embodiment, RAM 402 is partitioned into two segments with entries 420 belonging to a first segment and entries 422 belonging to a second segment. As stated, each segment of RAM 402 includes a number of entries equal to a number of entries 410 of CAM 401. Each entry of each segment corresponds to a respective CAM 401 entry 410. For example, RAM 402 entries 420a and 422a correspond to CAM entry 410a, RAM entries 420b and 422b correspond to CAM entry 410b. It is noted that only four entries for each RAM segment and for CAM 401 are shown: RAM entries 420a-d and 422a-d, as well as CAM entries 410a-d. Various embodiments may include any suitable number of entries in both CAM 401 and RAM 402.

Each entry in each RAM 402 segment includes information for a single physical address, PADDR 411 and address mask 413. Each CAM entry 410 may, therefore, map to a number of physical addresses equal to a number of RAM 402 segments, equal to two physical addresses in the present embodiment. As an example of the operation of TLB 200 utilizing CAM 401 and RAM 402, refer again to requested virtual address 330 in FIG. 3. Requested virtual address 330 has a value of 0x1055AA4321. Similar to the description above in regards to FIG. 3, control logic, such as, e.g., control logic 201 in FIG. 2, determines that the PID value and CID value match CAM entry 410b. Control logic 201 then uses the value of size 406 to determine that address bits [14:0] should be masked to create a search address of 0x1055AA0000, which matches VADDR 405 of entry 410b. In various embodiments, CAM 402 returns a single address in response to the match or multiple addresses. If a single address is returned, then control logic 201 determines which RAM 402 segment to select by using an additional address bit of requested address 330, such as bit [14], and then accesses the selected segment with the single address. If multiple addresses are returned by CAM 401, then one address, corresponding to one entry of one RAM 402 segment, is selected dependent upon the additional address bit.

In the present embodiment, CAM entry 410 returns a single address corresponding to RAM entries 420b and 422b. Bit [14] of requested address 330 is '1' which corresponds to RAM entry 422b. The physical address is determined by masking requested address 330 using address mask 413 (resulting in 0x0000004321) and combining with PADDR 411 of entry 422*b* (0x95432F0000) resulting in a physical address of 0x95432F4321, which is then used to fulfill the memory request.

It is noted that the tables of FIG. 4 are merely examples to demonstrate operation of an embodiment of a translation lookaside buffer. In other embodiments, more than two physical addresses may be mapped to a respective CAM entry. Information stored in each of CAM entries 410 and RAM entries 420 and 422 may be in another order and/or the number of fields may be different.

Figure 5:
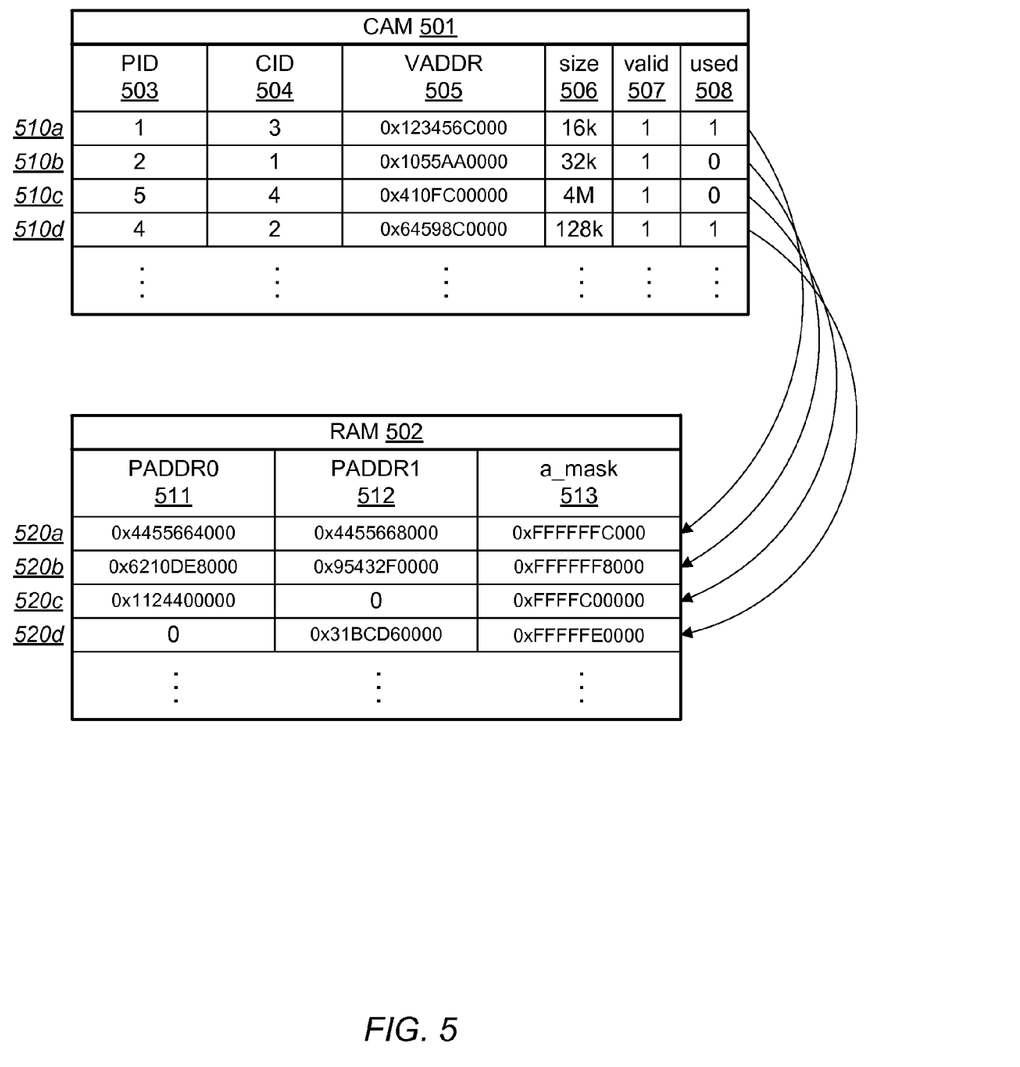
FIG. 5 shows a third embodiment of data tables associated with a translation lookaside buffer.

Moving now to FIG. 5, additional illustrations of data tables associated with an embodiment of a translation lookaside buffer are shown. CAM 501 and RAM 502 may correspond to CAM 301 and RAM 302 in FIG. 3 and the descriptions provided for FIG. 3 apply to the tables of FIG. 5, except as noted otherwise. In FIG. 3, the fields of CAM entry 310*d* and RAM entry 320*d* are all set to '0' indicating, in the present embodiment, an open or otherwise available entry in the TLB. The fields of CAM entry 510*d* and RAM entry 520*d*, however, are populated with non-zero values.

During operation of an embodiment of a TLB such as, for example, TLB 200 in FIG. 2, if a TLB miss occurs for a requested address not found in CAM 501, control logic 201 may create a new entry corresponding to the requested virtual address. Before a new entry is created, an available entry space in CAM 501 is identified. If an open entry, such as entry 310*d* in FIG. 3, is available, then the data associated with the TLB miss is stored in the fields of CAM entry 310*d* and respective RAM entry 320*d*.

If, however, an empty entry is not found, then control logic 201 looks for an older entry that is suitable for replacement with the new request. Control logic 201 may first look at the used bit 508 for each entry. As presented above, a value of used bit 508 indicates if the respective entry has been used since a last time that the used bit 508 was reset or cleared. Used bit 508 is reset to '0' at the initialization of TLB 200 and set to '1' when subsequently used in a TLB hit. Used bits 508 are cleared again when some number of the total number of used bits 508 in TLB 200 have been set. For example, in some embodiments, used bits 508 may be cleared to '0' once all entries have been used, while in other embodiments, used bits 508 may be reset after 90% of the bits have been set.

In CAM 501, entries 510*a* and 510*d* have used bits 508 that have been set. Entries 510*b* and 510*c*, however, have clear used bits, making these two entries candidates for replacement. To select from multiple candidate entries for replacement, control logic 201 may consider other fields of each of the entries. For example, the PID 503 or CID 504 values may be used, with respective values indicating higher or lower priorities for replacement. In some embodiments, another field, such as a time stamp (not shown) may be used to highlight older entries to be prioritized for replacement. Control logic 201 may also determine a number of physical pages mapped to each of the CAM entries 510*b* and 510*c* in order to select one for replacement. In the present embodiment, each CAM entry 510 is capable of mapping logical addresses to two physical pages of a memory, corresponding to PADDR0 511 and PADDR1 512. RAM entry 520*b* includes physical addresses for each page, while entry 520*c* includes a physical address only for PADDR0 511. Control logic 201 may select entry 520*c* for replacement rather than entry 520*b* since entry 520*c* maps fewer physical addresses.

It is noted that the data tables of FIG. 5 are examples for demonstration purposes. Different fields as well a different number of fields may be used in other embodiments. In some embodiments, more than two physical addresses may be mapped to a respective CAM entry.

Figure 6:
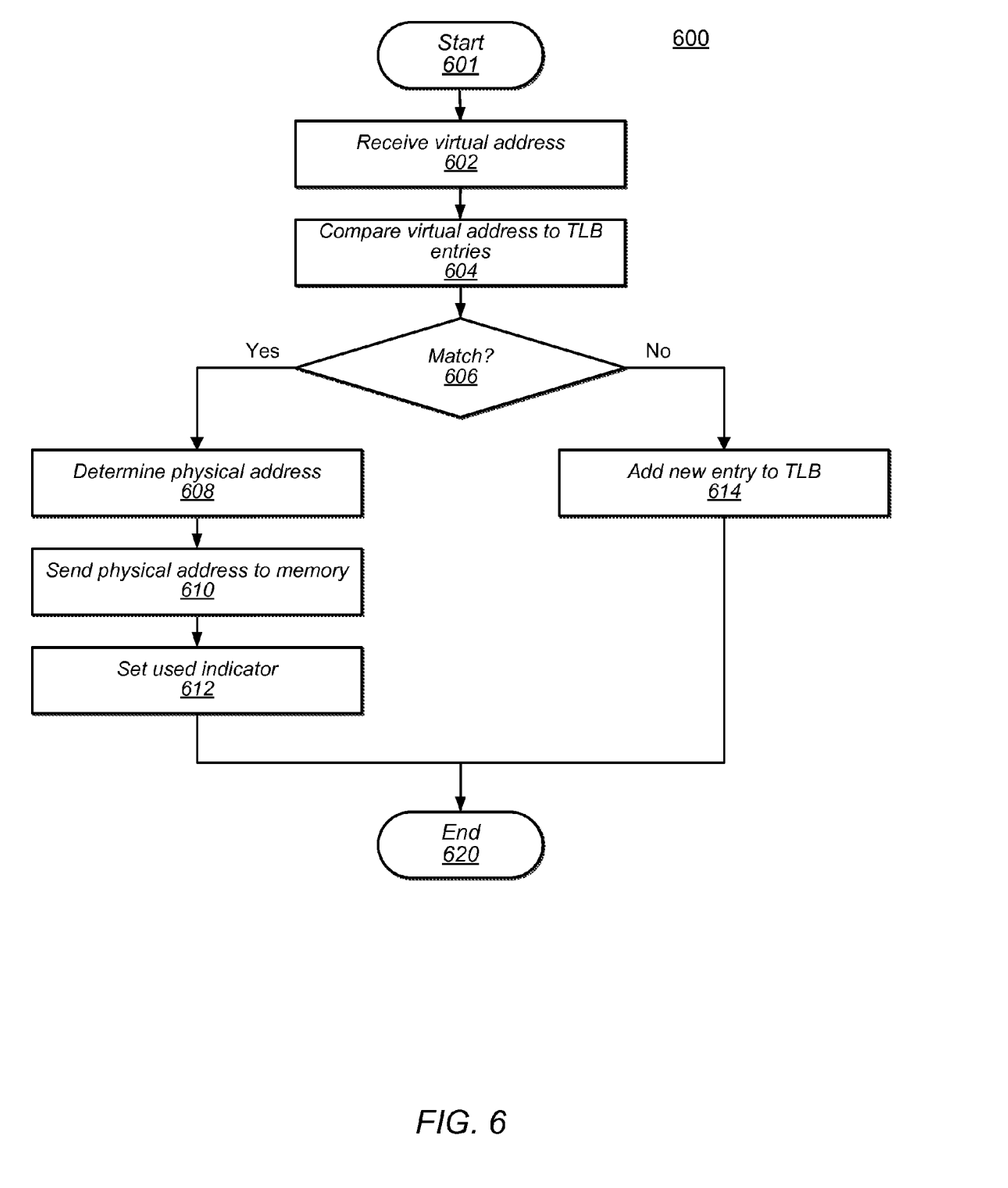
FIG. 6 is a flow diagram illustrating an embodiment of a method for operating a translation lookaside buffer.

Turning to FIG. 6, a flow diagram illustrating an embodiment of a method for operating a translation lookaside buffer is illustrated. Method 600 may be applied to a translation lookaside buffer included in a computing system, such as, for example TLB 200 of FIG. 2. Referring collectively to FIG. 2 and the flowchart of FIG. 6, the method begins in block 601.

TLB 200 receives a virtual address for translation (block 602). Control logic 201 receives a virtual address to be translated into a physical address for a memory access. The address may be received from a processing unit in a computing system, such as core 101 in FIG. 1. The virtual address may correspond to a memory access command for a range of addresses. For example, the virtual address may be a starting address for a file being accessed by a software program executing in core 101. In other embodiments, the virtual address may be a starting address for a software program requested by an operating system. A given virtual address may, therefore, be mapped to a plurality of physical memory pages.

Control logic 201 compares the received virtual address to entries in CAM 201 (block 604). CAM 201 includes TLB entries for virtual addresses that have been previously requested. A portion of the bits of the virtual address is used to search the TLB entries for a matching virtual address. In addition to the virtual address, the memory request may also include, in some embodiments, additional information such as a context ID indicating a software routine making the request and/or a partition ID identifying one of a plurality of memory devices included in a computing system or identifying a respective partition of one memory device. This additional may be used to determine a TLB hit or miss.

Further operations of the method may depend on a determination if a matching address is found (block 606). If the portion of the received virtual address matches a portion of a virtual address of an existing TLB entry (a TLB hit), then CAM 203 returns an address for a respective entry in RAM 205 and the method moves to block 608 to determine a corresponding physical address. Otherwise, if a matching address entry is not found (a TLB miss), the method moves to block 614 to add a new entry to TLB 200. Details of adding a new TLB entry will be disclosed below.

If a TLB hit occurs, then TLB 200 determines a respective physical address (block 608). The address from the TLB entry in CAM 203 is used to identify one or more corresponding entries in RAM 205. In some embodiments, a corresponding entry in RAM 205 may include physical address information for two or more pages of memory. Physical address information for one of the pages is selected using one or more bits of the virtual address that may not have been used when searching CAM 203 in block 604. In other embodiments, each entry in RAM 205 may include physical address information for a single page of memory. In such embodiments, RAM 205 may be partitioned into a number of segments with each entry assigned to one of the segments. CAM 203 returns an address for a given entry in the RAM segments while a given RAM segment is selected using one or more bits of the virtual address. Regardless of the embodiment, the physical address may be determined using physical address information included in the RAM 205 entry and a portion of the bits of the virtual address.

The physical address is sent to fulfil the requested memory access (block 610). The physical address may be sent back to core 101 to complete the memory access command. In other embodiments, the physical address may be sent to a memory controller in the computing system, or to a memory device corresponding to the physical address.

Control logic 201 sets a used bit in the matching CAM 203 entry (block 612). The used bit indicates that the respective entry in TLB 200 has been used for a TLB hit since a last time that the used bits for the TLB entries have been reset. In some embodiments, more than one bit may be used for indicating whether or not a given entry has been used in a TLB hit. For example, two bits may be used to indicate a number of times the respective entry has been 'hit.' Upon creating a new entry, the respective used bit may be set, while in other embodiments, the used bit may initially be clear and set after a subsequent hit. If, upon setting the used bit, all used bits in TLB 200 are set, then control logic 201 may clear all used bits in CAM 203. Once the respective used bit has been updated, the method ends in block 620.

It is noted that the method illustrated in FIG. 6 is merely an example embodiment. Although the operations illustrated in method 600 are depicted as being performed in a sequential fashion, in other embodiments, some of the operations may be performed in parallel or in a different sequence. In some embodiments, additional operations may be included.

Figure 7:
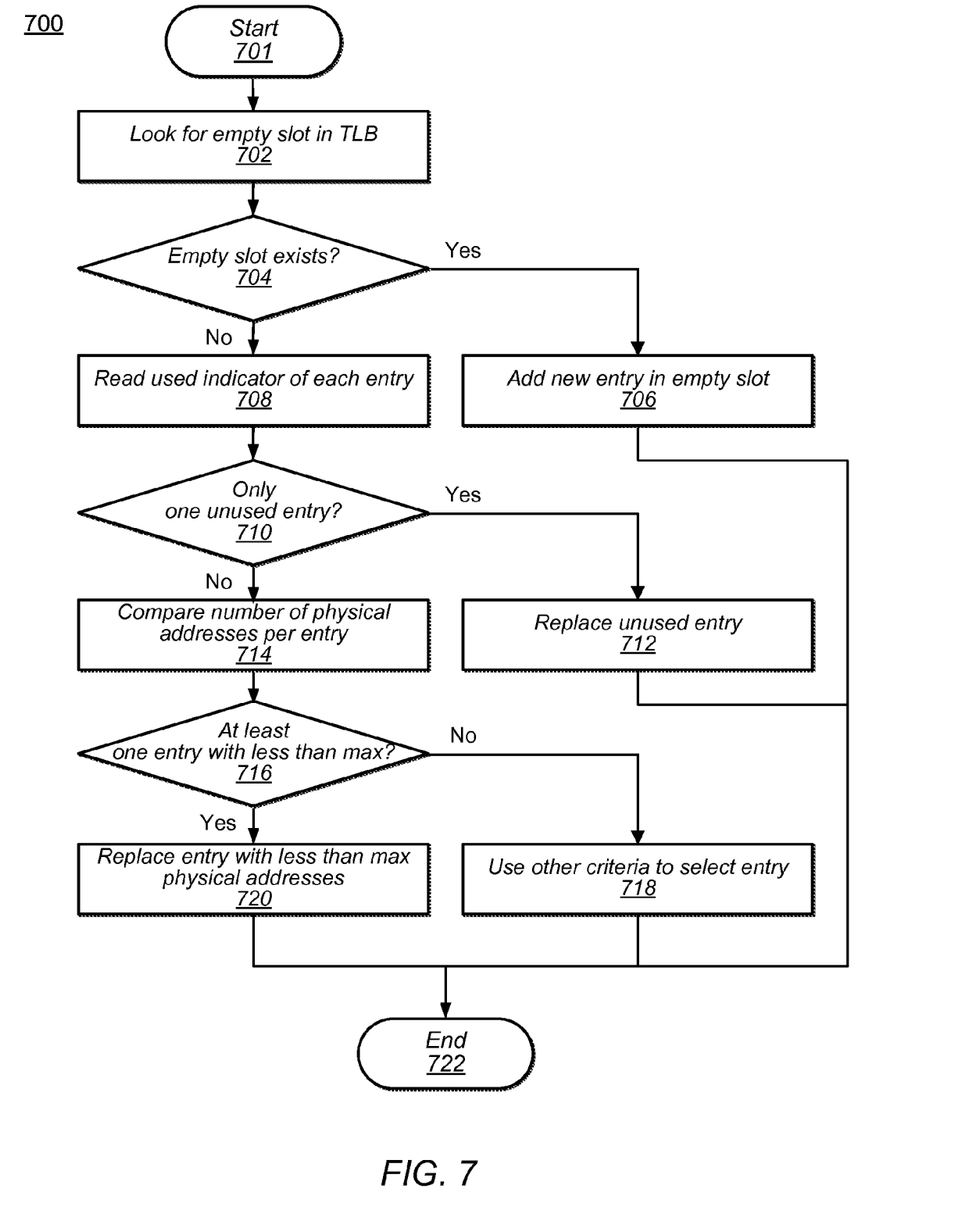
FIG. 7 is a flow diagram illustrating an embodiment of a method for adding an entry to a translation lookaside buffer.

Moving to FIG. 7, a flow diagram illustrating an embodiment of a method for adding an entry to a translation lookaside buffer is illustrated. The operations of method 700 may correspond to operations associated with block 614 of method 600 in FIG. 6. Method 700 may be applied to a TLB included in a computing system, such as, for example TLB 200 of FIG. 2 which may include the data tables illustrated in FIG. 5. Referring collectively to FIG. 2, FIG. 5 and the flowchart of FIG. 7, the method begins in block 701 after a TLB miss has occurred.

Control logic 201 searches CAM 501 for an empty entry (block 702). In the present embodiment, a new TLB entry is added to TLB 200 upon a TLB miss. An available space or "slot" in CAM 501 and corresponding slot in RAM 502 is identified and selected for storing the information related to the missed virtual address. Control logic 201 may search for an entire entry that is clear or may search a given field, such as VADDR 505, to determine an empty entry. CAM 501 returns a value for each corresponding empty entry found.

Further operations of the method may depend on a determination if an empty entry is found (block 704). If an empty entry is found, then the method may move to block 706 to add the new entry. Otherwise, the method may move to block 708 to continue the search for a suitable entry to replace.

If an empty entry is identified, then control logic 201 adds the new entry in the empty slot (706). Control logic 201 stores relevant information corresponding to the fields for CAM 501. In the event that more than one empty entry is identified, then control logic may select a first empty entry found or may use other criteria for selecting an appropriate entry, such as, for example, grouping entries by PID 503 or CID 504 values. The method may then end in block 722.

If an empty slot is not identified, then control logic 201 searches the used bit indicators in each of the occupied entries (block 708). Control logic 201 determines which entries have used bits 508 clear. A clear used bit 508 indicates that the respective entry has not been hit since the bit was last clear. The lack of a TLB hit may imply that the virtual address is not used as often as virtual addresses included in other CAM 501 entries.

Continuing operations of method 700 may depend on a number of entries with clear used bits 508 (block 710). Control logic 201 determines a number of CAM entries 510 with clear used bits 508. If there is just a single entry with used bit 508 clear, then the method moves to block 712 to replace the one entry. Otherwise, the method moves to block 714 to use additional criteria to select an entry for replacement. For example, CAM 501 shows two entries 510 with clear used bits 508, and entries 510b and 510c would therefore be identified as candidate entries for replacement.

If a single entry is identified with a clear used bit 508, then this single entry is selected for replacement by the new entry (block 712). Data from the old entry is discarded or written over with the data for the new entry. The data for the new entry may link the missed virtual address to more than one page of memory. Control logic may receive the physical address information from core 101 once core 101 receives the physical address information from another source in the computing system, such as, for example, a memory controller. Once control logic 201 stores the information for the new entry in the replacement entry's slot, the method ends in block 722.

If more than one entry with unused bit 508 clear is identified, then a number of physical addresses included in each of the identified RAM entries 520 is determined (block 714). Control logic 201 searches the identified entries 520 in RAM 502 to determine which ones include less than a maximum number of physical addresses. Each entry of RAM 502 includes fields for a physical address for more than one page of memory, allowing more than one page of memory to be mapped to a range of virtual addresses. For example, CAM entries 510b and 510c were identified as having clear used bits 508. Each of their corresponding RAM entries, 520b and 520c, respectively, may each store a maximum of two physical addresses. Each entry is read to determine a number of physical addresses in each one. Entry 520b includes the maximum two physical addresses versus entry 520c which includes only one of two possible physical addresses. Control logic 201 may, therefore, identify entry 520c as a candidate for replacement. Other entries, that are not illustrated, may also be identified if they meet the search criteria.

Further operations of method 700 may depend on a number of entries identified with less than the maximum number of physical addresses (block 716). Control logic 201 determines if at least one entry is identified with fewer than the maximum number of physical addresses. If no entry is identified, then the method moves to block 718 to use other means for selecting an entry for replacement. Otherwise, the method moves to block 720 to replace a selected entry with the new entry. In some embodiments, control logic 201 may select a first entry 520 with less than a maximum number of physical addresses rather than search all the identified entries. In such an embodiment, control logic may stop searching once entry 520c is identified and move to block 720 rather than continuing to search additional entries (not illustrated).

If no entries 520 are identified in block 716, then other criteria may be used to select a replacement entry (block 718). Examples of other possible selection criteria include relative values of PID 503, CID 504, or valid bit 507, time stamps indicating when an entry was first added to TLB 200, or count values indicating how often a respective entry is hit. In some embodiments, values corresponding to the new entry, such as PID 503 or CID 504, may be compared to existing entries and the new entry may be discarded if its associated values are lower priority than those of the existing entries. Once control logic 201 selects a suitable entry for replacement, information for the new entry is stored in the replacement entry's slot and the method ends in block 722.

If at least one entry is identified with less than the maximum number of physical addresses, a replacement entry is selected and replaced by the new entry (block 720). If a single entry is identified, then control logic replaces it with the information for the new entry. If more than one entry is identified, then additional criteria may be used to select one, as just described above. In other embodiments, control logic 201 may select a first one of the identified entries based on an address or index number of the entry. Control logic 201 selects a suitable entry for replacement, stores the information for the new entry in the replacement entry's slot and the method ends in block 722.

It is noted that the method illustrated in FIG. 7 is an example for demonstrating the disclosed concepts. Operations are illustrated as occurring in a sequential fashion. In other embodiments, however, some of the operations may be performed in parallel or in a different sequence. Additional operations may be included in some embodiments.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   a memory including a plurality of pages;
   a processor configured to access data from a subset of the plurality of pages based on a first virtual address and a second virtual address; and
   a translation lookaside buffer (TLB) coupled to the processor, wherein the TLB is configured to:
   store a plurality of entries;
   compare the first virtual address to respective address information included in each entry of the plurality of entries; and
   add a new entry to the plurality of entries in response to a determination that the first virtual address fails to match the respective address information included in each entry of the plurality of entries, wherein the new entry includes address information that includes one virtual address, and at least two physical address, which corresponds to at least two pages of the subset of the plurality pages;
   determine that a subset of bits of the second virtual address corresponds to a subset of bits of the first virtual address; and
   send a respective physical address corresponding to the second virtual address to the memory, wherein the respective physical address is determined based on the second virtual address and one of the at least two physical addresses included in the new entry.

2. The system of claim 1, wherein each entry of the plurality of entries includes a respective information bit, and wherein to add the new entry to the plurality of entries, the TLB is further configured to identify an existing entry of the plurality of entries based on the respective information bit.

3. The system of claim 2, wherein the TLB is further configured to determine the existing entry includes a number of physical addresses that is less than a maximum number of physical addresses, wherein the maximum number of physical addresses for each entry of the plurality of entries is greater than one.

4. The system of claim 3, wherein the TLB is further configured to replace the existing entry with the new entry.

5. A method for operating a memory, wherein the memory includes a plurality of pages, the method comprising:
   accessing, by a processor, first data from a subset of the plurality of pages based on a first virtual address, wherein the first virtual address corresponds to a first page of the subset;
   comparing the first virtual address to each entry of a plurality of entries included in a translation lookaside buffer (TLB), wherein each entry of the plurality of entries includes respective address information corresponding to at least one of the plurality of pages;
   adding a new entry to the plurality of entries in response to determining that the first virtual address fails to match the respective address information included in each entry of the plurality of entries, wherein the new entry includes address information that includes one virtual address and at least two physical address, which corresponds to at least two pages of the plurality of pages;
   accessing, by the processor, second data from the subset of the plurality of pages based on a second virtual address;
   determining that a first subset of bits included in the first virtual address corresponds to a second subset of bits included in the second virtual address;
   determining a corresponding physical address dependent upon the second virtual address and a respective one of the at least two physical addresses; and
   sending the corresponding physical address to the memory.

6. The method of claim 5, wherein each entry of the plurality of entries includes a respective information bit, wherein adding the new entry to the plurality of entries further comprises identifying an existing entry of the plurality of entries based on the respective information bit, and wherein a value of the respective information bit indicates that the existing entry has been unused since the respective information bit has been reset.

7. The method of claim 6, further comprising determining that the existing entry includes a number of physical addresses that is less than a maximum number of physical addresses, wherein the maximum number of physical addresses for each entry is greater than one.

8. The method of claim 7, further comprising replacing the existing entry with the new entry.

9. An apparatus, comprising:
   a first memory configured to store a first plurality of entries;
   a second memory configured to store a second plurality of entries, wherein each entry of the second plurality of entries corresponds to a respective one of the first plurality of entries; and circuitry configured to:
receive a first virtual address, wherein the first virtual address corresponds to a first address location of first data stored in a plurality of pages included in a system memory;
add a first entry to the first plurality of entries in response to a determination that the first virtual address is excluded from the first plurality of entries, wherein the first entry includes information indicative of the first virtual address; and
create a second entry in the second plurality of entries that corresponds to the first entry of the first plurality of entries, wherein the second entry includes a plurality of physical addresses, wherein each physical address of the plurality of physical addresses corresponds to a respective page of the plurality of pages;
receive a second virtual address, wherein the second virtual address corresponds to a second address location of second data stored in the plurality of pages in the system memory;
determine that a first subset of bits of the first virtual address stored in the first entry corresponds to a second subset of bits of the second virtual address;
determine a corresponding physical address based on the second virtual address and a respective one of the plurality of physical addresses in the second entry; and
send the corresponding physical address to the system memory.

10. The apparatus of claim 9, wherein the second memory includes a single array with multiple rows, and wherein to create the second entry in the second plurality of entries, the circuitry is further configured to store the plurality of physical addresses in a single row of the second memory.

11. The apparatus of claim 9, wherein the second memory includes a plurality of segments, wherein each segment of the plurality of segments includes a plurality of rows, and wherein to create the second entry in the second plurality of entries, the circuitry is further configured to store each physical address of the plurality of physical addresses in a respective row of a respective segment of the plurality of segments.

12. The apparatus of claim 9, wherein each entry of the first plurality of entries includes a respective information bit, and wherein to add the first entry to the first plurality of entries, the circuitry is further configured to:
identify an existing entry of the first plurality of entries based on the respective information bit, wherein a value of the respective information bit indicates that the existing entry has been unused since the respective information bit has been reset;
determine that a corresponding entry of the second plurality of entries includes a number of physical addresses that is less than a maximum number of physical addresses, wherein the maximum number of physical addresses for each entry is greater than one; and
replace the existing entry with the first entry.

* * * * *